United States Patent [19]

Kreth et al.

[11] Patent Number: 4,850,191

[45] Date of Patent: Jul. 25, 1989

[54] CONTROL ARRANGEMENT FOR AT LEAST TWO HYDRAULIC CONSUMERS FED BY AT LEAST ONE PUMP

[75] Inventors: Norbert Kreth, Lohr; Martin Schmitt, Goldbach; Armin Stellwagen, Lohr/Main

[73] Assignee: Mannesmann Rexroth GmbH, Fed. Rep. of Germany

[21] Appl. No.: 138,930

[22] Filed: Dec. 29, 1987

[30] Foreign Application Priority Data

Dec. 30, 1986 [DE] Fed. Rep. of Germany ....... 3644745

[51] Int. Cl.[4] .............................................. F16D 39/00

[52] U.S. Cl. ........................................ 60/422; 60/426; 60/427; 60/433; 60/452; 60/459; 91/511; 91/532

[58] Field of Search ................. 60/433, 459, 452, 422, 60/426, 427; 91/511, 532

[56] References Cited

U.S. PATENT DOCUMENTS

| | | | |
|---|---|---|---|
| 4,327,549 | 5/1982 | Bianchetta et al. | 60/426 |
| 4,708,596 | 11/1987 | Palm et al. | 60/459 X |
| 4,712,375 | 12/1987 | Kauss et al. | 60/422 X |
| 4,712,376 | 12/1987 | Hadank et al. | 60/452 X |
| 4,738,103 | 4/1988 | Tha | 60/452 X |
| 4,739,617 | 4/1988 | Kreth et al. | 60/427 X |
| 4,756,156 | 7/1988 | Appel | 60/426 |
| 4,759,183 | 7/1988 | Kreth et al. | 60/445 X |

FOREIGN PATENT DOCUMENTS

| | | |
|---|---|---|
| 2651325 | 8/1977 | Fed. Rep. of Germany . |
| 2911118 | 10/1979 | Fed. Rep. of Germany . |
| 3428403 | 4/1985 | Fed. Rep. of Germany . |
| 3532816 | 3/1987 | Fed. Rep. of Germany . |

*Primary Examiner*—Edward K. Look

*Attorney, Agent, or Firm*—Harness, Dickey & Pierce

[57] ABSTRACT

A pump supplies a plurality of consumers each via a directional control valve with pressure balance. When the pump delivery is not adequate, manifesting itself in a dropping of the pump pressure, the pressure balance of the consumer with the highest load pressure is displaced out of the end position of its regulating position into a further control position in which a control pressure line is connected via a throttle point to a discharge so that by means of the throttle point a control pressure is generated which is used for equiproportional reduction of the supply flow to the consumers. This is done either by reducing the stroke of the directional control valves or by acting on the pressure balances in the closure direction.

14 Claims, 2 Drawing Sheets

Figure 1:
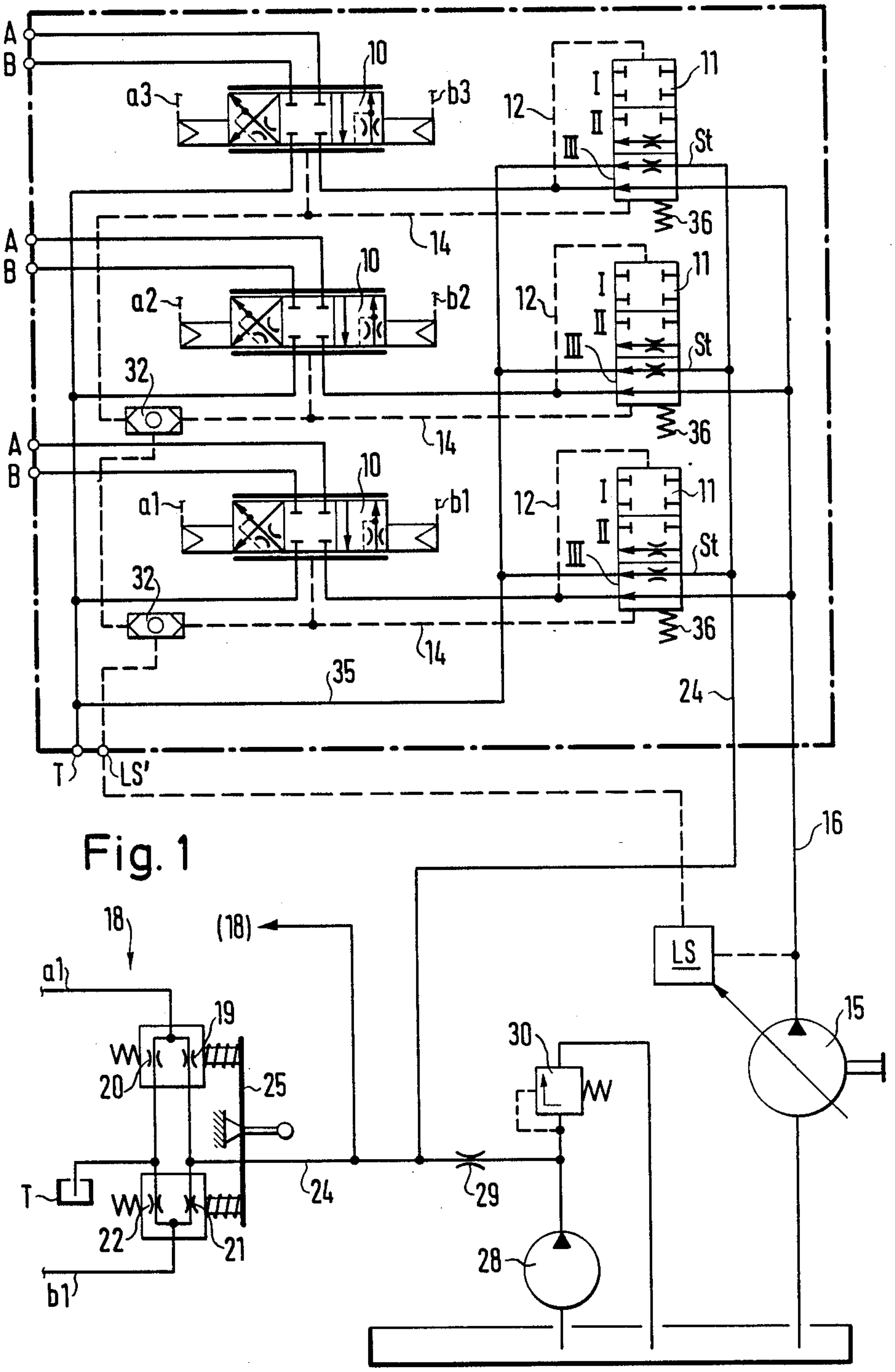

CONTROL ARRANGEMENT FOR AT LEAST TWO HYDRAULIC CONSUMERS FED BY AT LEAST ONE PUMP

The invention relates to a control arrangement for at least two hydraulic consumers fed by at least one pump comprising the features set forth in the preamble of claim 1.

In pilot-controlled directional control valves it is known (DE-OS No. 2,651,325) in dependence upon the pressure difference between the pump pressure and the respective highest load pressure to reduce the pilot pressure when the pump delivery rate is no longer sufficient to supply the loads or consumers with the flow rates set at the directional control valves and the pump pressure therefore drops. Via the reduced pilot pressure and the pilot valves the stroke or travel of all the driven directional control valves is reduced equiproportionally so that the adjustment velocity of the consumers is correspondingly reduced without any consumer coming to a standstill. In the known arrangement a regulating valve is provided which is subjected to the pump pressure and the respective highest load pressure in opposite sense and is disposed in the control pressure line leading to the pilot valves of the directional control valves. In the event of a power hole of the main delivery pump and a corresponding pressure drop the valve adjusts itself and reduces the control pressure.

Such an arrangement is presumed known in the preamble of claim 1.

It has also been proposed (P No. 35.32 816) to reduce the flow rates to the consumers equiproportionally in the event of a power hole of the pump in that the pressure balances preceding the individual directional control valves are subjected to a common control pressure in the closure direction which is generated in a regulating valve in dependence upon the pressure difference between the pump pressure and the highest load pressure. To conduct the control pressure to the pressure balances the latter are provided with an additional positioning or adjusting means or an additional control pressure chamber.

The problem underlying the invention is to use the already existing pressure balances for generating a control pressure without any additional means, said control pressure in turn serving to reduce equiproportionally the flow through the directional control valves to the individual consumers should the delivery of the pump be inadequate.

Said problem is solved according to the invention by the characterizing features of claim 1.

Advantageous further developments of the invention will be apparent from the subsidiary claims.

Thus, according to the invention the pressure balance which in its regulating position has already reached the end position for the minimum pressure drop from the pump to the directional control valve is displaced when the pump pressure drops beyond said regulating position into a control position in which a control pressure line is connected via a throttle point to a discharge. As a result a control pressure is generated which is used for the preferably equiproportional reduction of the supply flow to the consumers.

Three embodiments are possible. If the directional control valves have hydraulic pilot control the control pressure supplied to the control generators or pickups for setting the pilot pressure is reduced equiproportionally and thus also the stroke of the directional control valves. In this case the control devices for setting the pilot pressure must be constructed so that the lowering of the control pressure on the inlet side results in a corresponding reduction of the pilot pressure set at the control device. In the usual pressure-reducing valves used as pilot valves this is not the case because in them a change in inlet pressure is compensated. Thus, in the embodiment outlined the control pressure present in the control pressure line is reduced with the control position of a pressure balance and acts via the pilot pickups or generators on the directional control valves to reduce their stroke jointly.

On the other hand, it is alternatively possible to build up the control pressure in the control position of a pressure balance and then use said control pressure to jointly relax all the pressure balance springs so that the flow to the directional control valves is reduced accordingly. Any desired type of actuation of the directional control valves can be used (hydraulic, mechanical, electrical, or the like).

Figure 2:
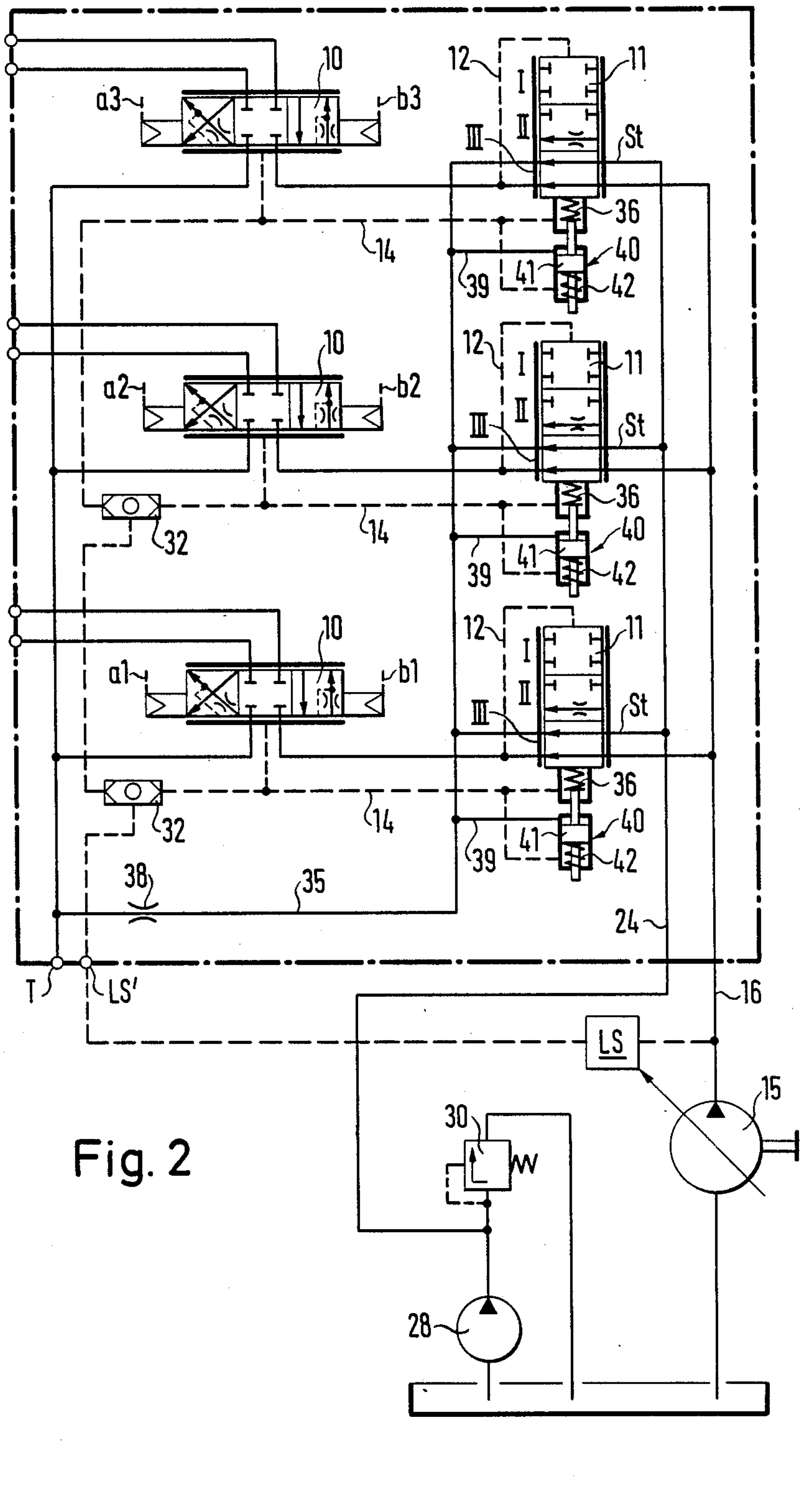

Examples of embodiment of the invention will be explained hereinafter in detail with the aid of the drawings, wherein:

FIG. 1 shows a hydraulic circuit diagram of the control arrangement in which the generated pressure acts via the respective pilot generator or pickup on the precontrolled directional control valves and FIG. 2 shows a hydraulic circuit diagram of a control arrangement in which the control pressure generated acts in each case on the pressure balances.

Three precontrolled or pilot-controlled directional control valves 10 are combined in a control block and associated with each directional control valve is a pressure balance 11 in the admission, the piston of which is subjected via a line 12 to the inlet-side pressure of the directional control valve and via a line 14 to the outlet-side pressure of the directional control valve, i.e. to the working pressure in a line leading to the connections A and B.

The fluid delivered by a pump 15 to the line 16 is supplied to all the pressure balances 11. The directional control valves 10 are pilot controlled. For the stroke adjustment the connections a1, a2, a3 and b1, b2, b3 are subjected to a pilot pressure which is set at a respective pilot pickup or generator 18 associated with each directional control valve 10. Each pilot pickup 18 is constructed as pressure divider in each case with two oppositely adjustable throttle valves 19, 20 and 21, 22. The throttle valves 19 and 20 lie in series between a control pressure line 24 and a tank T. The connection a1 of the directional control valve 10 is connected to the connection between the throttle valves 19 and 20. The same applies to the connection b1 of the directional control valve. All the pilot pickups 18 are made up in corresponding manner and connected to the control pressure line 24.

The actuation of each pilot pickup or generator is by a hand grip 25. On movement thereof for setting a pilot pressure at the connection a1 the upper throttle point 19 is opened and the throttle point 20 is adjusted in the closure direction, the pressure at the connection a1 thereby rising. In the unactuated state the throttle point 19 is closed and the throttle point 20 open towards the tank. The desired pilot pressure for adjusting the associated directional control valve 10 is thus generated by pressure division. The same applies to the choice of the pilot pressure at the connection b1.

The pressure in the control pressure line 24 is generated by a pump 28 which is connected via a throttle 29 to the control pressure line 24 and protected by a valve 30. The control pressure line 24 is further led to a connection St of each pressure balance 11.

Via shuttle valves 32 the highest load pressure occurring at a directional control valve 10 is selected and led via a connection LS' of the valve block to a delivery flow regulator LS of the pump 15.

Each pressure balance 11 comprises three main positions. In position I the pressure balance is closed, the position II corresponds to the regulating position in which the flow from the delivery line 16 to the directional control valve is throttled to a greater or lesser extent until in said regulating position the minimum pressure drop to the directional control valve is set, and III corresponds to the so-called control position in which the fluid can likewise flow from the line 16 unthrottled to the directional control valve. In the closure position I and the regulating position II the control pressure line St is blocked whilst in the control position III the control pressure line 24 is connected to a line 35 leading to the tank T.

It is apparent that the positions I and II correspond to the usual design of a flow regulating valve in which the regulating piston is subjected in the opening direction to the pressure of a regulating spring 36 and to the pressure on the outlet side of the directional control valve, i.e. to the pressure in the line 14, and in the closure direction to the pressure on the inlet side of the directional control valve via the line 12.

The pressure balance is thus first brought by the regulating spring 36 into the regulating position II. Due to the change in working resistance the load pressure in the line 14 changes. If the load pressure drops the regulating piston of the pressure balance is displaced in the closure direction until the equilibrium condition is reached at which the pressure difference at the regulating piston corresponds to the force of the regulating spring 36. Thus, in spite of different working resistances at constant pump pressure the adjustment velocity of the consumer is kept constant by changing the flow resistance in the pressure balance.

When the delivery of the pump 15 is no sufficient, i.e. when the pressure in the line 12 drops in a power hole of the pump 15, the regulating piston can be shifted from the regulating position II into the control position III illustrated in which although the minimum flow resistance from the line 16 to the directional control valve is maintained the control pressure line 24 is however connected with the discharge line 35 to the tank via a throttle cross-section set by the regulating piston of the pressure balance. By the pressure differance at the regulating piston of the pressure balance the throttle cross-section in the control position III is set so that the control pressure in the line 24 drops and a correspondingly reduced control pressure is supplied to all the pilot devices 18. This leads to a corresponding reduction of the pilot pressures set at the individual pilot devices 18 and thus to a preferably equiproportional stroke reduction of all the directional control valves 10 via the pilot pressures.

Alternative constructions for the conversion of the control signal for the pressure balance to achieve a volume flow adaptation will of course embody the idea underlying the invention. Thus, the driving of the pressure or flow valves with the pressure in the line St is just as possible as the use of standard control generators or pickups 18 with pressure-reducing function. In the latter case an equiproportional volume flow reduction is not achieved but a preferred stroke reduction for the directional control valves 10 adjusted most.

Thus, when the pump delivery rate is not adequate the pressure balance associated with the load having the particular highest load pressure is displaced out of its end position in the regulating position II, in which it has the minimum flow resistance, beyond said end position into a special control position III in which via the throttle cross-section of the pressure balance the control pressure supplied to the pilot devices 18 is correspondingly reduced.

FIG. 2 likewise shows a valve block having three directional control valves 10 and associated pressure balances 11, corresponding components being designated by the same reference numerals. The positions I and II also correspond to those of a conventional pressure balance.

In this embodiment as well the regluating piston of the pressure balance can be displaced out of the regulating position II in which the end position for the maximum flow from the line 16 to the associated directional control valve 10 is reached to a control position III in which the maximum flow from the line 16 to the directional control valve is maintained and the control pressure line 24 is connected to the discharge line 35 to the tank.

The difference compared with the embodiment of FIG. 1 is as follows: in the discharge line 35 a throttle 38 is disposed which in the pressure balance control position III is connected via the control line St to a constant pressure source 28, 30. In the end position of the pressure balance shown an unthrottled connection is established so that the full pressure of the auxiliary control circuit is present in the line 35. In intermediate positions, not shown, of the pressure balances a throttling takes place of the flow from the line 24 to the line 35. The pressure in the line 35 is then governed by the pressure of the auxiliary source 28, 30, the throttle cross-section of the orifice 38 and the throttle cross-section of the additional control edge at the pressure balance. If several pressure balances are operating in the end position region the effective throttle value is the resultant of the individual values of the throttle resistances which are then connected in parallel. Said control pressure in the line 35 is conducted via branch lines 39 to additional positioning or adjusting means 40 of the pressure balances to reduce the preset force of the spring 36 and thus obtain an equiproportional reduction of the pressure difference across the directional control valve 10 and thus of the volume flow passing through. The positioning means 40 for all the pressure balances 11 are of the same construction and consist in each case of a piston 41 acting on the regulating spring 36 of the associated pressure balance. In the closure direction of the pressure balance the control pressure in the line 39 acts on the piston 41 and in the opening direction a spring 42 and the load pressure in the line 14.

Instead of the adjusting or positioning means 40 the pressure balance can also be provided in accordance with P No. 35 32 816 with an additional control pressure chamber which is subjected to the control pressure and causes a corresponding displacement of the regulating piston of the pressure balance.

We claim:

1. Control arrangement for at least two hydraulic consumers fed by at least one pump in which there is associated with each consumer a direction-controlling and speed-controlling directional control valve and between the respective directional control valve and the pump a pressure balance is provided having a regulating position for setting a load-independent flow, said pressure balance being subjected to a pressure difference existing between the inlet and the outlet of the associated directional control valve and including means for reducing the flow when the pump delivery rate is inadequate, characterized in that means are provided for moving each pressure balance when the pressure difference drops below a predetermined value from said regulating position into an additional control position, said pressure balance additional control position connecting a control pressure line via a throttle point to a discharge to generate a control pressure with which the supply flow to the consumers is reduced equiproportionally.

2. Control arrangement according to claim 1 comprising pilot valves for activating the hydraulically actuated directional control valves, characterized in that in the additional control position of the pressure balance the pressure supplied to all the pilot valves is reduced.

3. Control arrangement according to claim 2, characterized in that in the additional control position of the pressure balance the control pressure line leading to the pilot valve is connected via a throttle of the pressure balance to the discharge.

4. Control arrangement according to claim 3, characterized in that in the additional control position of the pressure balance the throttle cross-section is variable.

5. Control arrangement according to claim 1, characterized in that in the additional control position of the pressure balance a minimum flow resistance through the pressure balance to the associated directional control valve is provided.

6. Control arrangement according to claim 2, characterized in that the pilot valves are constructed as pressure dividers each having two throttle valves adjustable jointly and oppositely in pairs, the control pressure line being connected in each case via two throttle valves lying in series to a tank and the pilot pressure line leading to the associated directional control valve being connected in each case to the connection between two throttle valves.

7. Control arrangement according to claim 1, characterized in that in the additional control position of the pressure balance the control pressure generated in the control pressure line is led jointly to all the pressure balances and acts on the latter in the closure direction.

8. Control arrangement according to claim 7, characterized in that in the additional control position of the pressure balance the control pressure line is connected via a throttle to the tank.

9. Control arrangement according to claim 8, characterized in that a common throttle is provided for all the pressure balances.

10. Control arrangement according to claim 7, characterized in that each pressure balance is provided with a positioning means which acts on the regulating piston and the piston of which is subjected to the control pressure.

11. Control arrangement according to claim 10, characterized in that the piston of the positioning means acts on a regulating pressure spring of the pressure balance under the action of pressure against the force direction thereof.

12. Control arrangement according to claim 11, characterized in that the regulating spring is biased by the piston which is subjected to a pressure spring and the piston when subjected to a pressure against the force direction of the pressure spring is displaced to reduce the biasing of the regulating spring.

13. Control arrangement according to claim 7 characterized in that the control pressure acts on an additional control pressure chamber for the regulating piston of each pressure balance 11.

14. Control arrangement according to claim 1 characterized in that at least one of the consumers is excluded from the volume flow reduction.

* * * * *